US010078482B2

(12) United States Patent
Loseu et al.

(10) Patent No.: US 10,078,482 B2
(45) Date of Patent: Sep. 18, 2018

(54) MANAGING DISPLAY OF INFORMATION ON MULTIPLE DEVICES BASED ON CONTEXT FOR A USER TASK (71) Applicant: Samsung Electronics Co., Ltd., Suwon-si, Gyeonggi-do (KR)

(72) Inventors: Vitali Loseu, Irving, TX (US); Sourabh Ravindran, Dallas, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 90 days.

(21) Appl. No.: 14/952,798

(22) Filed: Nov. 25, 2015

(65) Prior Publication Data

US 2017/0147269 A1     May 25, 2017

(51) Int. Cl.
*G06F 3/14*     (2006.01)
*G09G 5/12*     (2006.01)
*G09G 5/14*     (2006.01)

(52) U.S. Cl.
CPC ............. *G06F 3/1423* (2013.01); *G09G 5/12* (2013.01); *G09G 5/14* (2013.01); *G09G 2354/00* (2013.01); *G09G 2370/04* (2013.01); *G09G 2370/20* (2013.01)

(58) Field of Classification Search
CPC combination set(s) only.
See application file for complete search history.

(56) References Cited

U.S. PATENT DOCUMENTS

| 2006/0294197 A1* | 12/2006 | Mital ................. G06Q 10/0633 709/217 |
| 2010/0138780 A1 | 6/2010 | Marano et al. |
| 2011/0165841 A1* | 7/2011 | Baek ....................... H04L 67/10 455/41.2 |
| 2013/0050230 A1 | 2/2013 | Jeong et al. |

(Continued)

FOREIGN PATENT DOCUMENTS

| EP | 2562638 A1 | 2/2013 |
| WO | 2009143294 A2 | 11/2009 |

OTHER PUBLICATIONS

Extended European Search Report for European Application No. 16868813.3, dated May 24, 2018. (16 pages).

*Primary Examiner* — Jennifer Mehmood
*Assistant Examiner* — Deeprose Subedi (57) ABSTRACT Methods and electronic devices for managing information context among devices. The method includes switching from displaying information of a first application to displaying information of a second application. The method also includes identifying information of the first application that is relevant to the second application. The relevant information includes at least a portion of the displayed information of the first application. Additionally, the method includes sending an indication of the relevant information to a second electronic device for display of the relevant information at the second electronic device. The method may also include, while displaying the information of the second application, receiving input information from the second electronic device. The input information may include at least a portion (Continued)

of the relevant information displayed at the second electronic device. Additionally, the method may include using the input information in the second application.

19 Claims, 4 Drawing Sheets

(56) References Cited

U.S. PATENT DOCUMENTS

| | | | | |
|---|---|---|---|---|
| 2014/0122726 | A1* | 5/2014 | Jafry | H04L 65/40 |
| | | | | 709/227 |
| 2016/0054841 | A1* | 2/2016 | Yang | H04L 51/046 |
| | | | | 715/719 |
| 2016/0301794 | A1* | 10/2016 | Schlakman | G06Q 10/06 |
| 2017/0153777 | A1* | 6/2017 | Kim | H04L 51/18 |

* cited by examiner

MANAGING DISPLAY OF INFORMATION ON MULTIPLE DEVICES BASED ON CONTEXT FOR A USER TASK

TECHNICAL FIELD

This disclosure relates generally to display of information on electronic devices. More specifically, this disclosure relates to managing display of information on multiple devices based on context for a user task.

BACKGROUND

Performing a practical task on an electronic device, such as a smart phone, may require using multiple applications. Each individual application may have a specific narrow scope of information obtained from a previously used application. Moreover, different applications are often not designed to work together or have limited sharing of information between the applications. Frequently users need to switch back and forth between applications or memorize information from previously accessed applications, which reduces user experience.

SUMMARY

Embodiments of the present disclosure provide management of information context for a user task on multiple devices.

In one exemplary embodiment, a method for managing information context among devices is provided. The method includes switching from displaying information of a first application to displaying information of a second application. The method also includes identifying information of the first application that is relevant to the second application. The relevant information includes at least a portion of the displayed information of the first application. Additionally, the method includes sending an indication of the relevant information to a second electronic device for display of the relevant information at the second electronic device.

In another exemplary embodiment, an electronic device for managing information context among devices is provided. The electronic device includes a display, at least one processor, and a transceiver. The at least one processor is configured to cause the display to switch from displaying information of a first application to displaying information of a second application and identify information of the first application that is relevant to the second application. The relevant information including at least a portion of the displayed information of the first application. The transceiver is configured to send an indication of the relevant information to a second electronic device for display of the relevant information at the second electronic device.

In yet another exemplary embodiment, an electronic device for managing information context among devices is provided. The electronic device includes a display, at least one processor, and a transceiver. The transceiver is configured to receive, from a second electronic device, an indication of relevant information of a first application executed on the second electronic device that was switched from. The display is configured to display the relevant information.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize and take into account that relevant information can be lost to a user upon application switch. Embodiments of the present disclosure recognize and take into account that some solutions to loss of information between application switch may involve cloning/migrating applications between different devices, splitting application visualization components between multiple devices or portions of a screen, splitting application visualization and application control between different devices or portions of a screen, and selecting and migrating a portion of the UI to another device or portion of a screen. Embodiments of the present disclosure recognize that none of these address display of contextually relevant information on multiple devices.

For example, a user task to join a teleconference call may include launching a calendar application, retrieving a reminder or appointment from a calendar application, finding the number to call in the calendar appointment, pressing the number in the reminder, and switching to a telephone call application to make the call. In this example, the calendar application includes a display of details of the appointment and the telephone call application places a call. However, embodiments of the present disclosure recognize that relationships and as a result some calendar appointment information, for instance the meeting number or conference pin, is lost in the process of switching to the telephone call application and the user has to switch back to the calendar appointment to retrieve (and possibly memorize) the lost information.

In accordance with various embodiments of the present disclosure, when a user performs a task that requires an application switch, embodiments of the present disclosure detect the information displayed in the previous application that is still relevant to the overall user task and can forward that information to be displayed on a second electronic device while the user interface (UI) for the new application being displayed on the primary device.

Figure 1:
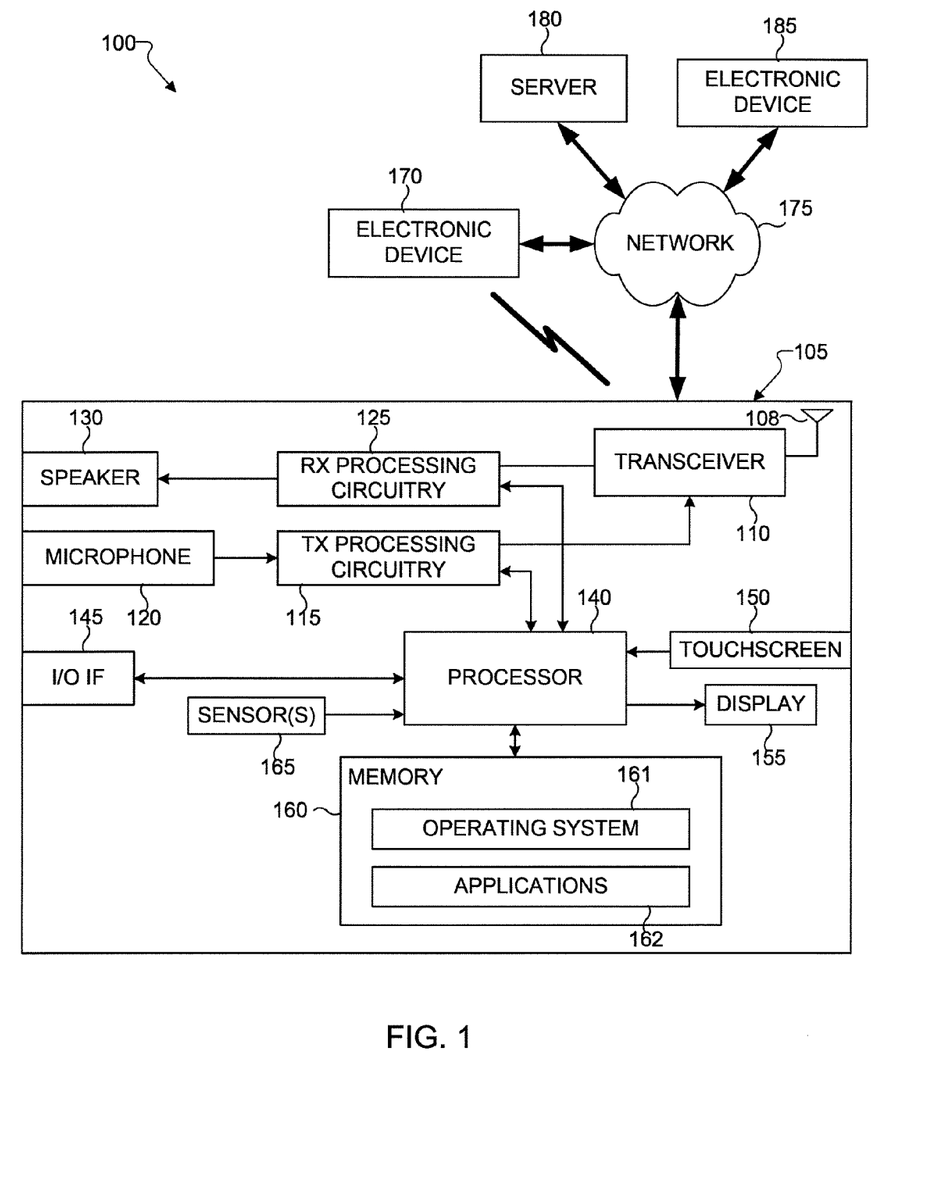
FIG. 1 illustrates an example wireless communication system in which various embodiments of the present disclosure may be implemented.

FIG. 1 illustrates an example electronic device 105 in a wireless communication system 100 in which various embodiments of the present disclosure may be implemented. The embodiment of the system 100 and the device 105 illustrated in FIG. 1 is for illustration only, the system 100 and the device 105 may come in a wide variety of configurations and include additional or alternative components. FIG. 1 does not limit the scope of this disclosure to any particular implementation of an electronic device or wireless communication system.

As shown in FIG. 1, the electronic device 105 includes an antenna 108, a transceiver 110, transmit (TX) processing circuitry 115, a microphone 120, and receive (RX) processing circuitry 125. The electronic device 105 also includes a speaker 130, a processor 140, an input/output (I/O) interface (IF) 145, a touchscreen 150, a display 155, a memory 160, and one or more sensors 165. The memory 160 includes an operating system (OS) 161 and one or more applications 162.

The transceiver 110 receives, from the antenna 108, an incoming RF signal transmitted by an access point (e.g., base station, WiFi router, Bluetooth device) for a network (e.g., a WiFi, Bluetooth, cellular, 5G, LTE, LTE-A, WiMAX, or any other type of wireless network). The transceiver 110 down-converts the incoming RF signal to generate an intermediate frequency (IF) or baseband signal. The IF or baseband signal is sent to the RX processing circuitry 125, which generates a processed baseband signal by filtering, decoding, and/or digitizing the baseband or IF signal. The RX processing circuitry 125 transmits the processed baseband signal to the speaker 130 (such as for voice data) or to the processor 140 for further processing (such as for web browsing data). In some embodiments, the The TX processing circuitry 115 receives analog or digital voice data from the microphone 120 or other outgoing baseband data (such as web data, e-mail, or interactive video game data) from the processor 140. The TX processing circuitry 115 encodes, multiplexes, and/or digitizes the outgoing baseband data to generate a processed baseband or IF signal. The transceiver 110 receives the outgoing processed baseband or IF signal from the TX processing circuitry 115 and up-converts the baseband or IF signal to an RF signal that is transmitted via the antenna 108. In some embodiments, the transceiver 110, the TX processing circuitry 115, and the RX processing circuitry 125 may be implemented within the same block or chip, such as a WiFi and/or Bluetooth module and/or chip.

The processor 140 can include one or more processors or other processing devices and execute the OS 161 stored in the memory 160 in order to control the overall operation of the electronic device 105. For example, the processor 140 could control the reception of forward channel signals and the transmission of reverse channel signals by the transceiver 110, the RX processing circuitry 125, and the TX processing circuitry 115 in accordance with well-known principles. In some embodiments, the processor 140 includes at least one microprocessor or microcontroller.

The processor 140 is also capable of executing other processes and programs resident in the memory 160. The processor 140 can move data into or out of the memory 160 as required by an executing process. In some embodiments, the processor 140 is configured to execute the applications 162 based on the OS 161 or in response to signals received from eNBs or an operator. The processor 140 is also coupled to the I/O interface 145, which provides the electronic device 105 with the ability to connect to other devices, such as laptop computers and handheld computers. The I/O interface 145 is the communication path between these accessories and the processor 140.

The processor 140 is also coupled to the touchscreen 150 and the display 155. The operator of the electronic device 105 can use the touchscreen 150 to enter data and/inputs into the electronic device 105. The display 155 may be a liquid crystal display, light-emitting diode (LED) display, optical LED (OLED), active matrix OLED (AMOLED), or other display capable of rendering text and/or at graphics, such as from web sites, videos, games, etc. The touchscreen 150 can include a touch panel, a (digital) pen sensor, a key, or an ultrasonic input device. The touchscreen 150 can recognize, for example, a touch input in at least one scheme among a capacitive scheme, a pressure sensitive scheme, an infrared scheme, or an ultrasonic scheme. The touchscreen 150 can also include a control circuit. In the capacitive scheme, the touchscreen 150 can recognize touch or proximity.

The memory 160 is coupled to the processor 140. Part of the memory 160 could include a random access memory (RAM), and another part of the memory 160 could include a Flash memory or other read-only memory (ROM).

Electronic device 105 further includes one or more sensors 165 that can meter a physical quantity or detect an activation state of the electronic device 105, and convert metered or detected information into an electrical signal. For example, sensor 165 may include one or more buttons for touch input, a camera, a gesture sensor, a gyroscope or gyro sensor, an air pressure sensor, a magnetic sensor or magnetometer, an acceleration sensor or accelerometer, a grip sensor, a proximity sensor, a color sensor 165H (e.g., a Red Green Blue (RGB) sensor), a temperature/humidity sensor, an illumination sensor, etc. The sensor(s) 165 can further include a control circuit for controlling at least one of the sensors included therein. As will be discussed in greater detail below, one or more of these sensor(s) 165 may be used to determine a task being performed by a user to identify information relevant to the task being performed.

Also as also illustrated in FIG. 1, the system 100 includes a network 175, which facilitates communication between various components in the system 100. For example, the network 175 may communicate Internet Protocol (IP) packets, frame relay frames, or other information between network addresses. The network 175 may also be a heterogeneous network including broadcasting networks, such as cable and satellite communication links. The network 175 may include one or more local area networks (LANs); metropolitan area networks (MANs); wide area networks (WANs); all or a portion of a global network, such as the Internet; or any other communication system or systems at one or more locations.

The network 175 facilitates communications between at least one server 180 and various client electronic devices 105, 170, and 185. Each server 180 includes any suitable computing or processing device that can provide computing services for one or more client devices. Each server 180 could, for example, include one or more processing devices, one or more memories storing instructions and data, and one or more network interfaces facilitating communication over the network 175.

Each client electronic devices 105, 170, and 185 represents any suitable computing or processing device that interacts with at least one server or other computing device(s) over the network 175. For example, the client electronic devices 105, 170, and 185 communicate via one or more base stations, such as cellular base stations or eNodeBs. Also, the client electronic devices 105, 170, and 185 may communicate via one or more wireless access points, such as IEEE 802.11 wireless access points. These are example communication connections and each client device could communicate directly with the network 175 or indirectly with the network 175 via any suitable intermediate device(s) or network(s). Still further, as will be discussed in greater detail below, the electronic devices 105, 170, and 185 may communicate with each other either directly (e.g., via Bluetooth or another peer to peer connection) or over the network 175.

As described in more detail below, the electronic devices 105, 170, and 185 may include circuitry and/or programming for managing display of information on multiple devices based on context for a user task. In various embodiments, the electronic devices 105, 170, and 185 may take different forms and the present disclosure is not limited to any particular form. For example, one or more of electronic devices 105, 170, and 185 may be a mobile communication device, such as, for example, a user equipment, a mobile station, subscriber station, wireless terminal, smart phone, a tablet, etc. In other examples, one or more of electronic devices 105, 170, and 185 may take the form of a wearable electronic device, such as for example, a smart watch, smart glasses, an activity tracker, a head mounted display, or other type of wearable device having a display. In further examples, one or more of electronic devices 105, 170, and 185 may be stationary devices such as, for example, a television or kiosk.

Although FIG. 1 illustrates one example of an electronic device 105, various changes may be made to FIG. 1. For example, various components in FIG. 1 could be combined, further subdivided, or omitted and additional components could be added according to particular needs. As a particular example, the processor 140 could be divided into multiple processors, such as one or more central processing units (CPUs) and one or more graphics processing units (GPUs). In one or more embodiments, the speaker 130, the microphone 120, and or the touchscreen 150 may not be included in the device 105. In some embodiments, the display 155 and the touchscreen 150 may be combined or may be implemented as different layers of a screen for the device 105.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Embodiments of the present disclosure recognize that when user performs an action that causes an active application change, some information that is still relevant in the context of the user task is not accessible in the new application. For example, interaction with a phone number in a calendar application switches the view of the phone to a phone call application while a teleconference PIN is left in the calendar application and is inaccessible. In an example illustrated in FIG. 2, interaction with an address in a messaging application (e.g., text messaging, chant messaging, or email application) switches a view of the electronic device 200 to that of a UI for a map application 210. Additional notes (such as parking details) are inaccessible in the map application. In another example, interactions with a link (e.g., URL) in a message switches a messaging application to a web browser application, while comments about the link included in the information of the previous messaging application are inaccessible in the currently displayed UI for the web browser application.

In all of these non-exhaustive examples, information from a previously used application is often helpful or need as an additional input to the presently switched to application. Embodiments of the present disclosure provide for dynamic display of contextually relevant information on multiple devices. In lieu of requiring the user to manually switch back and forth between applications or memorize the information not otherwise available in the presently switched to application, embodiments of the present disclosure, identify and extract relevant information from prior application(s) and provide this relevant information for use in the present application. During an application view switch, embodiments of the present disclosure identify a user's overall task (i.e., the task being performed using the present application or series of applications used by the user) and dynamically detect and select information that is relevant to the user's overall task. In various embodiments, this information is seamlessly forwarded and or displayed in a second electronic device. Embodiments of the present disclosure allow a user to interact with this information on the second electronic device to automatically input, forward, update and/or populate data into the new application on the first electronic device.

Figure 2:
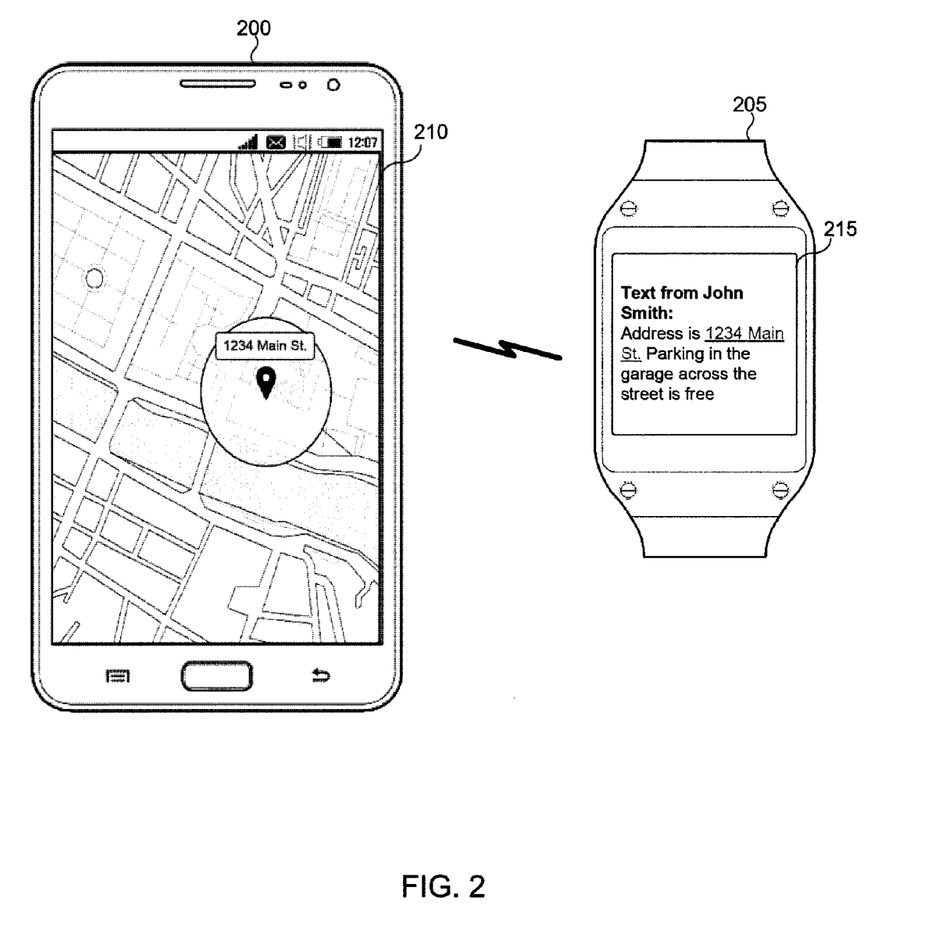
FIG. 2 illustrates an example of relevant information display in accordance with various embodiments of the present disclosure.

FIG. 2 illustrates an example of relevant information display in accordance with various embodiments of the present disclosure. The example illustrated in FIG. 2 is for illustration only. Additional relevant information display between applications may be implemented in addition to the example illustrated in FIG. 2, for example, as discussed hereinafter. The electronic devices 200 and 205 illustrated in FIG. 2 may be an example of implementations of any of the electronic devices 105, 170, and 185 in FIG. 1. Additionally, while the adjectives "first" and "second" are used to distinguish between different devices, use of the term "first" or "second" is not meant to imply any physical or architectural limitation on the functions that can be performed on either device in accordance with the principles of the present disclosure. For example, either of the first or second electronic devices may undergo the application switch, identify the relevant information, forward an indication of the relevant information, display the relevant information, or forward an input of the relevant information to the other of the devices.

In the example illustrated in FIG. 2, a user had selected an address for a meeting location in a text messaging application on the first electronic device 200 which caused the first electronic device 200 to switch the display to that of map application 210. In this illustrative example, the electronic device 200 identifies that additional information is relevant to the user's overall task of navigating to the meeting location, which in this example, is parking information for the meeting location, is not available in and otherwise lost by the map application 210. The electronic device 200 forwards an indication of the relevant information to the second electronic device 205, in this example a smart watch, for display of the relevant information, in this example the entire text message, by the second electronic device 205. As a result, the user is provided with all the relevant information for navigating to the meeting location without being required to switch back and forth between applications or memorize the information.

In various embodiments, the user can forward the relevant information back to the first electronic device for use of the information in the application on the first electronic device. For example, performing some action, such as, a button press on the relevant information on the second electronic device triggers action on the first electronic device. This action may also be a hold-and-swipe, to forward the relevant information to a relevant application field on the first electronic device. For example, without limitation, the forwarded information may be copied to a clipboard for use with the application on the first electronic device, inserted into fillable fields (e.g., shipping or payment information fields) of the application on the first electronic device, may be inserted and used as in input (e.g., a PIN or search input).

Various embodiments of the present disclosure provide identification of information a user finds relevant for various primary device applications through the use of context. In one embodiment, the methods and electronic devices of the present disclosure can detect which information is relevant to the user's overall task and is not present in the new application. For example, the electronic device may track the task being performed by the user between application switches and shift a portion of the UI switched from to another electronic device based on an estimation of the user task. This may include the electronic device identifying a type of relationship between the old and new applications and/or the mechanism used for switching between applications. For example, whenever a link is selected to switch between applications, the electronic device can identify the type of link selected (e.g., a URL, a recognized address, a recognized phone number, etc.) and the type of application of the switched from and switched to applications. In another example, the electronic device may track a sequence, type, and relationship between or among of applications switched between or among either manually or automatically, within a given period of time to estimate the user task.

Using this identified contextual information, the electronic device may estimate the overall task being performed by the user search the switched from application to determine whether any information relevant to the overall user task is located in the switched from application but not otherwise available in the switched to application. For example, the electronic device may perform a text search for information that may be relevant to a user application, which may include, for example, optical character recognition of text in images. In these examples, the electronic device may forward the relevant information by forwarding the UI for the prior application, certain text from the prior application, or an image from the prior application for display by the second electronic device. The electronic device sends an indication of the relevant information that may include, for example, the relevant information itself an indication of the relevant information for the second electronic device to obtain the relevant information. For example, the first electronic device may send a message identifier or application identifier for the second electronic device to launch a corresponding application and/or retrieve a corresponding message, for example, from a server.

In some embodiments, in addition to or instead of the inter-application switch context information, the electronic device may identify information about the context of the task being performed using inputs from sensors (e.g., such as sensor(s) 165) located on one or more of the first electronic device, the second electronic device, or sensors in the environment. For example, the second electronic device may include and use sensor(s) to identify audio played by the first electronic device and display information relevant to the audio played (e.g., purchase information or related products to a movie, television show, or song played on the first electronic device). In another example, the electronic device may receive information from sensors that are part of home automation equipment or system, such as for example, to estimate the task being performed by the user. In another example, the electronic device may identify a location of the electronic device and estimate the user task based on tasks performable at the identified location of the electronic device, and possibly also based on the application executing on the electronic device.

In some embodiments, the electronic device may identify the relevant information based on default or manual user preferences. For example, the user may have pre-established preferences, that when selecting a link switching to a new application, certain information from or the UI for the switched application is forwarded or "pushed" for display on the second electronic device. In other examples, the user preference may be specific to particular applications that are the switched from and/or switched to applications.

Figure 3:
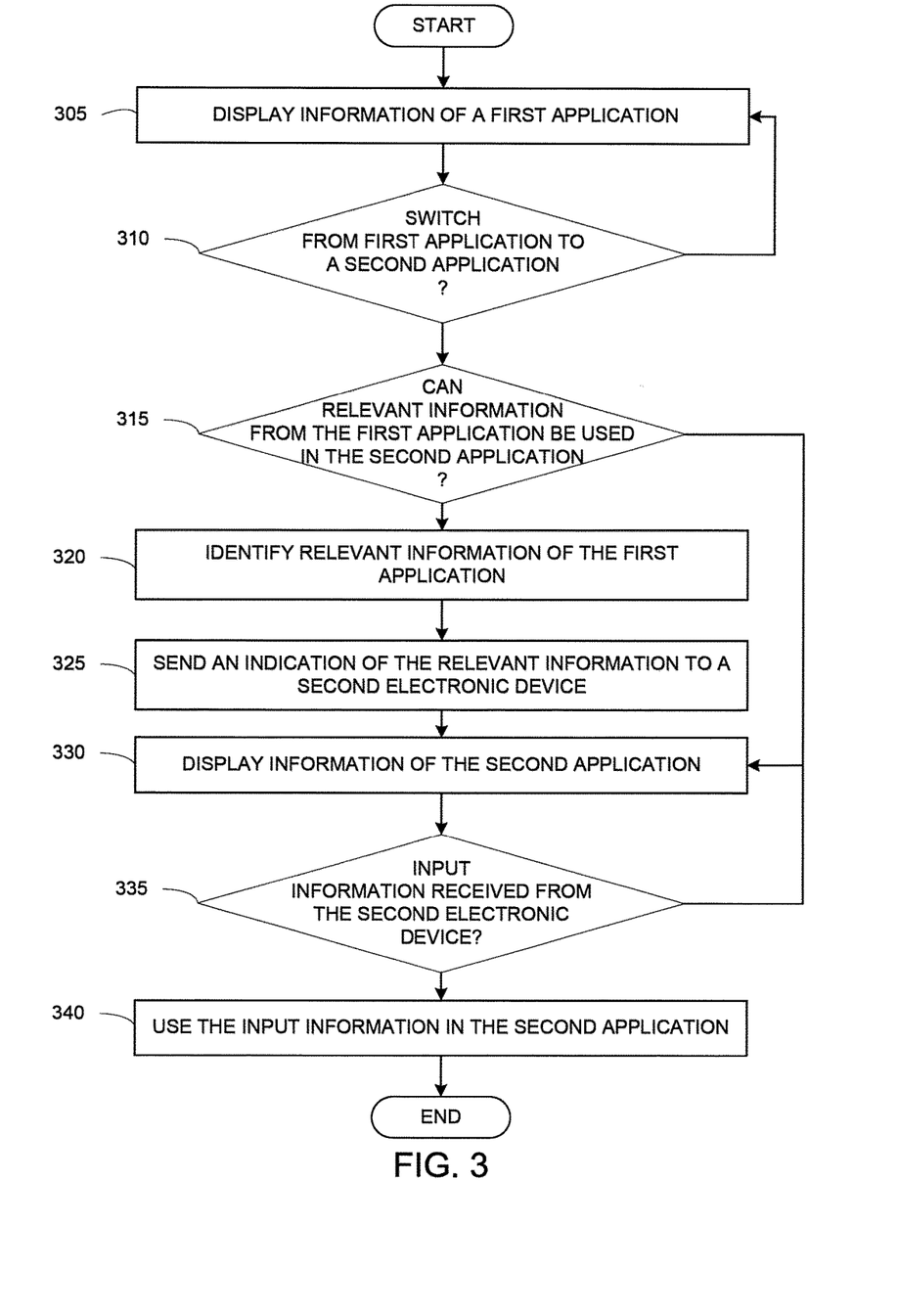
FIG. 3 illustrates a process for managing information context among devices in accordance with various embodiments of the present disclosure.

FIG. 3 illustrates a process for managing information context among devices in accordance with various embodiments of the present disclosure. For example, the process depicted in FIG. 3 may be performed by the electronic device 105 in FIG. 1. The process may also be implemented by either of the electronic devices 200 or 205 in FIG. 2.

The process begins with the electronic device displaying information of a first application (step 305). For example, in step 305, the electronic device may display a UI for the first application that includes a selectable link triggering a switch to a second application. The electronic device determines whether a switch from first application to a second application is requested (step 310). For example, in step 310, the electronic device may detect a selection of a link or a manual application switch by a user.

The electronic device determines whether relevant information from the first application can be used in the second application (step 315). For example, in step 315, the electronic device may search the first application to determine whether missing or helpful information displayed in the UI for the first application is not available or displayed in the UI for the second application, for example, by a comparison of the information displayed for the respective applications.

If the electronic device determines that relevant information from the first application can be used in the second application, the electronic device identifies relevant information of the first application (step 320). For example, in step 320, the electronic device may identify the relevant information based on a setting indicating a preference for the relevant information to be displayed at the second electronic device when switching from the first application to the second application. In another example, the electronic device may estimate a task being performed using the second application and identify the relevant information of the first application based on the estimated task. In another example, the electronic device may identify a relationship between the first and second applications based on properties of the first and second applications, respectively (e.g., tasks performed by the respective applications, a link selected to cause the switch between the applications) and identify the relevant information of the first application based on the identified relationship. In another example, the electronic device may identify context information based on an input from one or more sensors located in the electronic device, a second electronic device, or in the environment and identify the relevant information of the first application based on the identified context information.

The electronic device sends an indication of the relevant information to a second electronic device (step 325). For example, in step 325, the electronic device may send the indication for the second electronic device to display of the relevant information at the second electronic device. The indication may include the relevant information as text, an application UI, an image, etc. In other examples, the indication may include an indicator of an application to launch and/or a message or image to retrieve, for example, from a server.

Thereafter, the electronic device displays information of the second application (step 330). The electronic device then determines whether input information from the second electronic device has been received (step 335). For example, in step 335, the electronic device may receive an input that includes at least a portion of the relevant information displayed at the second electronic device.

The electronic device then uses the input information in the second application (step 340). For example, in step 340, the electronic device may copy the received information to a clipboard for a user to paste into a relevant portion, display the relevant information, for example, in a notification or pop-up, and/or populate relevant fields for the second application (e.g., fill-in shipping or address fields, enter the information into a search field and process a search, enter the information as a PIN, etc.)

Figure 4:
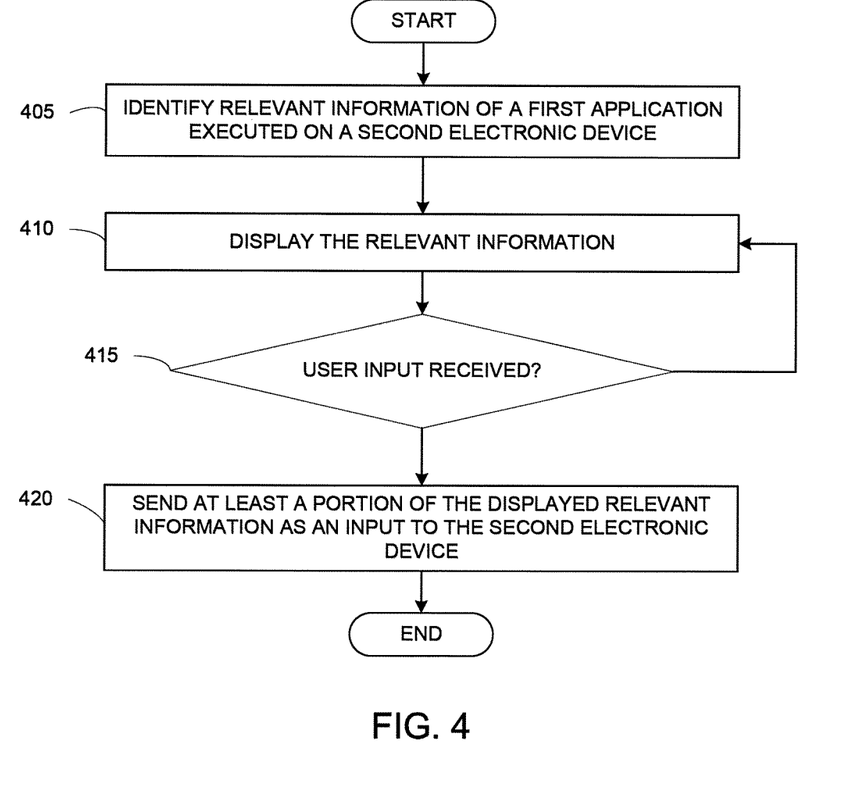
FIG. 4 illustrates another process for managing information context among devices in accordance with various embodiments of the present disclosure.

FIG. 4 illustrates another process for managing information context among devices in accordance with various embodiments of the present disclosure. For example, the process depicted in FIG. 4 may be performed by the electronic device 105 in FIG. 1. The process may also be implemented by either of the electronic devices 200 or 205 in FIG. 2. In this illustrative embodiment, the electronic device performing the process illustrated in FIG. 4 may be the second electronic device referred to in the process of FIG. 3 and vice versa.

The process begins with the electronic device identifying relevant information of a first application executed on a second electronic device (step 405). For example, in step 405, the electronic device may receive, from the second electronic device, an indication of the relevant information of the first application executed on the second electronic device that was switched from. In another example, the electronic device may send a request to the second electronic device for the indication of the relevant information of the first application executed on the second electronic device that was switched from, for example, based on a user input or an indication that the user is looking at the display of the electronic device (e.g., detecting an inclination angle or range of the electronic device using an accelerometer or gyroscope, processing image data captured by a camera of the electronic device showing eyes of the user looking in a direction of the display of the electronic device, etc. In another example, the electronic device may estimate the task being performed at the second electronic device using inputs from sensors (e.g., sensor(s) 165) and identify the relevant information of the first application based on the estimated task being performed at the second electronic device. For example, the electronic device may identify context information for the task being performed based on audio inputs sensed by a microphone and identify a song, movie, or television show using the context information, where the first electronic device is a television or media player.

The electronic device displays the relevant information (step 410). For example, in step 410, the electronic device may display information from the first application switched from and/or information determined to be relevant to the task the user is performing at the second electronic device. The electronic device determines whether a user input has been received with respect to the displayed relevant information (step 415). For example, in step 415, the electronic device may detect a touch of a portion of the displayed information or a swiping motion on the display of the electronic device toward a direction the second electronic device.

The electronic device sends at least a portion of the displayed relevant information as an input to the second electronic device (step 420). For example, in step 420, the electronic device may send the portion of the relevant information to the first application or a second application executed on the second electronic device in response to a user input.

Although FIGS. 3 and 4 illustrate examples of processes for managing information context among devices various changes could be made to FIGS. 3 and 4. For example, while shown as a series of steps, various steps in each figure could overlap, occur in parallel, occur in a different order, occur multiple times, or be omitted in one or more embodiments of the present disclosure.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for operating an electronic device, the method comprising:
    displaying information of a first application on the electronic device, the displayed information includes first and second contextually related information;
    selecting the first contextually related information;
    based on the selected first contextually related information, switching from displaying information of the first application to displaying information of a second application on the electronic device such that the first application is no longer displayed;
    identifying, by the electronic device, information of the first application that is relevant information to the second application, the relevant information including the second contextually related information of the displayed information of the first application, the second contextually related information being unavailable in the second application; and
    sending an indication of the relevant information to a second electronic device for display of a portion of the displayed information of the first application including the second contextually related information at the second electronic device while displaying information of the second application on the electronic device.

2. The method of claim 1, further comprising:
    while displaying the information of the second application on the electronic device, receiving input information from the second electronic device, the input information comprising the second contextually related information displayed at the second electronic device; and
    using the input information in the second application.

3. The method of claim 1, wherein identifying the relevant information comprises identifying the relevant information based on a setting of the electronic device indicating a preference for the relevant information to be displayed at the second electronic device when switching from the first application to the second application on the electronic device.

4. The method of claim 1, wherein identifying the relevant information comprises:
    estimating a task being performed using the second application; and
    identifying the relevant information of the first application based on the estimated task.

5. The method of claim 1, wherein identifying the relevant information comprises:
    identifying a relationship between the first and second applications based on properties of the first and second applications, respectively; and
    identifying the relevant information of the first application based on the identified relationship.

6. The method of claim 1, wherein identifying the relevant information comprises:
    identifying context information based on an input from one or more sensors; and
    identifying the relevant information of the first application based on the identified context information.

7. The method of claim 6, wherein the one or more sensors are located in the second electronic device.

8. The method of claim 1, wherein:
    identifying the relevant information comprises identifying the relevant information based on a user input while the information of the first application is displayed; and
    sending the indication of the relevant information to the second electronic device comprises
    sending the relevant information to the second electronic device in response to the user input.

9. An electronic device comprising:
    a display;
    at least one processor, the at least one processor configured to:
        cause the display to display information of a first application, the displayed information of the first application includes first and second contextually related information;
        select the first contextually related information;
        based on the selection, cause the display to switch from displaying information of the first application to displaying information of a second application such that the first application is no longer displayed; and
        identify information of the first application that is relevant information to the second application, the relevant information including the second contextually related information of the displayed information of the first application, the second contextually related information being unavailable in the second application; and
    a transceiver configured to send an indication of the relevant information to a second electronic device for display of a portion of the displayed information of the first application including the second contextually related information at the second electronic device while the display displays information of the second application on the electronic device.

10. The electronic device of claim 9, wherein:
    the transceiver is further configured to receive, while information of the second application is displayed, input information from the second electronic device, the input information comprising the second contextually related information displayed at the second electronic device; and
    the at least one processor is configured to use the input information in the second application.

11. The electronic device of claim 9, wherein the at least one processor is configured to identify the relevant information based on a setting of the electronic device indicating a preference for the relevant information to be displayed at the second electronic device when switching from the first application to the second application on the electronic device.

12. The electronic device of claim 9, wherein the at least one processor is configured to:
   estimate a task being performed using the second application; and
   identify the relevant information of the first application based on the estimated task.

13. The electronic device of claim 9, wherein the at least one processor is configured to:
   identify a relationship between the first and second applications based on properties of the first and second applications, respectively; and
   identify the relevant information of the first application based on the identified relationship.

14. The electronic device of claim 9, wherein the at least one processor is configured to:
   identify context information based on an input from one or more sensors; and
   identify the relevant information of the first application based on the identified context information.

15. The electronic device of claim 9, wherein:
   the at least one processor is configured to identify the relevant information based on a user input to the electronic device while the information of the first application is displayed; and
   the transceiver is configured to send the relevant information to the second electronic device in response to the user input.

16. An electronic device comprising:
   at least one processor of the electronic device configured to identify relevant information of a first application executed on a second electronic device, the relevant information including at least a portion of displayed information of the first application, wherein the displayed information of the first application includes first and second contextually related information;
   a transceiver configured to receive, from the second electronic device, an indication of the relevant information of the first application executed on the second electronic device when the second device switches from displaying information of the first application to displaying information of a second application such that the first application is no longer displayed, the indication of the relevant information comprises a portion of the relevant information of the first application including an indication of the second contextually related information, wherein the second contextually related information is unavailable to the second application; and
   a display configured to display the portion of the relevant information on the electronic device.

17. The electronic device of claim 16, wherein the transceiver is further configured to send a request to the second electronic device for the indication of the relevant information of the first application executed on the second electronic device when the second device switches from displaying information of the first application to displaying information of the second application.

18. The electronic device of claim 16, wherein the transceiver is further configured to send, to the second electronic device, at least a portion of the displayed relevant information as an input to the first application or a second application executed on the second electronic device in response to a user input.

19. The electronic device of claim 16, further comprising one or more sensors,
   wherein the at least one processor is configured to estimate a task being performed at the second electronic device based on one or more inputs from the one or more sensors; and identify the relevant information of the first application based on the estimated task being performed at the second electronic device.

* * * * *